United States Patent
Long et al.

(10) Patent No.: US 9,267,582 B2
(45) Date of Patent: Feb. 23, 2016

(54) SYSTEM AND METHOD FOR MULTIPLEXING GEAR ENGAGEMENT CONTROL AND PROVIDING FAULT PROTECTION IN A TOROIDAL TRACTION DRIVE AUTOMATIC TRANSMISSION

(71) Applicants: Charles F. Long, Pittsboro, IN (US); Darren J. Weber, Indianapolis, IN (US); John William Edward Fuller, Preston Lancashire (GB)

(72) Inventors: Charles F. Long, Pittsboro, IN (US); Darren J. Weber, Indianapolis, IN (US); John William Edward Fuller, Preston Lancashire (GB)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 14/076,869

(22) Filed: Nov. 11, 2013

(65) Prior Publication Data
US 2014/0066249 A1    Mar. 6, 2014

Related U.S. Application Data

(63) Continuation of application No. 12/957,877, filed on Dec. 1, 2010, now Pat. No. 8,578,802.

(60) Provisional application No. 61/287,038, filed on Dec. 16, 2009.

(51) Int. Cl.
*F16H 61/00* (2006.01)
*F16H 15/00* (2006.01)
*F16D 48/02* (2006.01)
*F16H 61/02* (2006.01)

(Continued)

(52) U.S. Cl.
CPC ............... *F16H 15/00* (2013.01); *F16D 48/02* (2013.01); *F16D 48/062* (2013.01); *F16H 61/0206* (2013.01); *F16D 2048/0209* (2013.01); *F16H 61/664* (2013.01); *Y10T 74/19251* (2015.01)

(58) Field of Classification Search
USPC .................... 475/207, 214, 215, 216; 74/335
See application file for complete search history.

(56) References Cited

U.S. PATENT DOCUMENTS

| | | | |
|---|---|---|---|
| 4,838,126 | A | 6/1989 | Wilfinger et al. |
| 4,922,788 | A | 5/1990 | Greenwood |

(Continued)

FOREIGN PATENT DOCUMENTS

| | | |
|---|---|---|
| GB | 2361510 | 10/2001 |
| GB | 2368618 | 5/2002 |

(Continued)

OTHER PUBLICATIONS

U.S. Appl. No. 61/286,974, dated Dec. 16, 2009, (31 pages).

(Continued)

*Primary Examiner* — Ha D Ho
(74) *Attorney, Agent, or Firm* — Barnes & Thornburg LLP

(57) ABSTRACT

An apparatus for multiplexing gear engagement control in an automatic transmission is provided. At least two friction engagement devices are configured to selectively engage and disengage a different gear ratio of the transmission. A trim system is configured to selectively supply engagement and disengagement pressures to at least one fluid passageway. A first control valve is fluidly coupled directly to the at least one fluid passageway and directly to each of the at least two friction engagement devices. The first control valve is configured to selectively route the engagement and disengagement pressures through the first control valve directly to the at least two friction devices.

19 Claims, 5 Drawing Sheets

(51) Int. Cl.
*F16D 48/06* (2006.01)
*F16H 61/664* (2006.01)

(56) References Cited

U.S. PATENT DOCUMENTS

| | | | |
|---|---|---|---|
| 5,090,951 | A | 2/1992 | Greenwood |
| 5,217,418 | A | 6/1993 | Fellows et al. |
| 5,232,414 | A | 8/1993 | Fellows et al. |
| 5,242,337 | A | 9/1993 | Greenwood |
| 5,263,907 | A | 11/1993 | Fellows |
| 5,308,297 | A | 5/1994 | Greenwood |
| 5,308,298 | A | 5/1994 | Lambert |
| 5,316,526 | A | 5/1994 | Fellows |
| 5,338,268 | A | 8/1994 | Greenwood |
| 5,395,292 | A | 3/1995 | Fellows et al. |
| 5,401,221 | A | 3/1995 | Fellows et al. |
| 5,423,727 | A | 6/1995 | Fellows |
| 5,453,061 | A | 9/1995 | Fellows |
| 5,521,819 | A | 5/1996 | Greenwood |
| 5,564,993 | A | 10/1996 | Robinson |
| 5,564,998 | A | 10/1996 | Fellows |
| 5,643,121 | A | 7/1997 | Greenwood et al. |
| 5,667,456 | A | 9/1997 | Fellows |
| 5,766,105 | A | 6/1998 | Fellows |
| 5,820,508 | A | 10/1998 | Konig et al. |
| 5,820,513 | A | 10/1998 | Greenwood |
| 5,895,337 | A | 4/1999 | Fellows et al. |
| 5,938,557 | A | 8/1999 | Greenwood |
| 5,971,885 | A | 10/1999 | Greenwood et al. |
| 6,030,310 | A | 2/2000 | Greenwood et al. |
| 6,066,067 | A | 5/2000 | Greenwood |
| 6,071,209 | A | 6/2000 | Greenwood |
| 6,273,839 | B1 | 8/2001 | Dutson |
| 6,292,732 | B1 | 9/2001 | Steinmetz et al. |
| 6,306,060 | B1 | 10/2001 | Dutson et al. |
| 6,312,356 | B1 | 11/2001 | Greenwood |
| 6,364,811 | B1 | 4/2002 | Hubbard et al. |
| 6,464,614 | B2 | 10/2002 | Dutson |
| 6,626,793 | B1 | 9/2003 | Greenwood |
| 6,666,791 | B1 | 12/2003 | Greenwood |
| 6,979,276 | B2 | 12/2005 | Murray |
| 7,018,320 | B2 | 3/2006 | Robinson et al. |
| 7,056,261 | B2 | 6/2006 | Fuller |
| 7,160,226 | B2 | 1/2007 | Fuller |
| 7,278,951 | B2 | 10/2007 | Fuller |
| 7,318,786 | B2 | 1/2008 | Greenwood et al. |
| 7,407,459 | B2 | 8/2008 | Greenwood et al. |
| 7,491,149 | B2 | 2/2009 | Greenwood et al. |
| 7,530,916 | B2 | 5/2009 | Greenwood |
| 7,563,194 | B2 | 7/2009 | Murray |
| 7,614,973 | B2 | 11/2009 | Parthuisot |
| 7,625,309 | B2 | 12/2009 | Fuller |
| 7,632,208 | B2 | 12/2009 | Greenwood et al. |
| 7,637,841 | B2 | 12/2009 | Dutson |
| 7,951,041 | B2 | 5/2011 | Dutson |
| 7,955,210 | B2 | 6/2011 | Greenwood et al. |
| 8,578,802 | B2 | 11/2013 | Long et al. |
| 2001/0041642 | A1 | 11/2001 | Miyata |
| 2004/0038773 | A1 | 2/2004 | Robinson et al. |
| 2005/0043138 | A1 | 2/2005 | Fuller |
| 2005/0143216 | A1 | 6/2005 | Greenwood et al. |
| 2005/0176547 | A1 | 8/2005 | DeFreitas |
| 2005/0211295 | A1 | 9/2005 | Long et al. |
| 2006/0142110 | A1 | 6/2006 | Greenwood et al. |
| 2006/0160656 | A1 | 7/2006 | Dutson |
| 2006/0184303 | A1 | 8/2006 | Long et al. |
| 2006/0201766 | A1 | 9/2006 | Fuller |
| 2007/0072736 | A1 | 3/2007 | DeFreitas et al. |
| 2007/0112495 | A1 | 5/2007 | Murray |
| 2007/0142163 | A1 | 6/2007 | Murray |
| 2007/0275817 | A1 | 11/2007 | Newall |
| 2008/0085801 | A1 | 4/2008 | Sedoni et al. |
| 2008/0146399 | A1 | 6/2008 | Oliver et al. |
| 2008/0153659 | A1 | 6/2008 | Greenwood |
| 2008/0176709 | A1 | 7/2008 | Wu et al. |
| 2008/0269001 | A1 | 10/2008 | Greenwood |
| 2009/0048054 | A1 | 2/2009 | Tsuchiya et al. |
| 2009/0062065 | A1 | 3/2009 | Field et al. |
| 2009/0075772 | A1 | 3/2009 | Ellis et al. |
| 2009/0203486 | A1 | 8/2009 | Murray |
| 2009/0253552 | A1 | 10/2009 | Foster |
| 2009/0305840 | A1 | 12/2009 | Oliver |
| 2011/0138898 | A1* | 6/2011 | Long et al. ............. 73/114.79 |
| 2011/0140017 | A1 | 6/2011 | Long et al. |
| 2011/0143882 | A1 | 6/2011 | Long et al. |
| 2011/0144872 | A1 | 6/2011 | Long et al. |
| 2011/0144925 | A1 | 6/2011 | Long et al. |
| 2011/0152031 | A1* | 6/2011 | Schoolcraft ................. 476/10 |
| 2012/0199217 | A1* | 8/2012 | Long et al. ................. 137/468 |
| 2012/0202642 | A1* | 8/2012 | Long et al. ................. 476/3 |
| 2012/0202643 | A1* | 8/2012 | Long et al. ................. 476/10 |

FOREIGN PATENT DOCUMENTS

| | | |
|---|---|---|
| GB | 2384531 | 7/2003 |
| GB | 2397630 | 7/2004 |
| GB | 2410302 | 7/2005 |
| GB | 2418235 | 3/2006 |
| GB | 2438412 | 11/2007 |
| GB | 2440746 | 2/2008 |
| GB | 2455030 | 6/2009 |
| GB | 2459857 | 11/2009 |
| GB | 2460237 | 11/2009 |
| GB | 2470717 | 12/2010 |
| GB | 2474870 | 5/2011 |
| WO | 97/40292 | 10/1997 |
| WO | 2011/075319 | 6/2011 |

OTHER PUBLICATIONS

U.S. Appl. No. 61/286,984, dated Dec. 16, 2009, (33 pages).
U.S. Appl. No. 61/287,003, dated Dec. 16, 2009, (29 pages).
U.S. Appl. No. 61/287,031, dated Dec. 16, 2009, (39 pages).
U.S. Appl. No. 61/287,038, dated Dec. 16, 2009, (33 pages).
Torotrak Full Toroidal Variator (http://www.torotrak.com/IVT/works/variator.htm), 5 pages (accessed Sep. 24, 2009).
International Search Report and the Written Opinion for International Application No. PCT/US2010/060032, dated Feb. 11, 2001, (9 pages).
International Search Report and the Written Opinion for International Application No. PCT/US2010/056247, dated Jan. 21, 2011, (10 pages).
International Search Report and the Written Opinion for International Application No. PCT/US2010/056244, dated Jan. 21, 2011, (9 pages).
International Search Report and the Written Opinion for International Application No. PCT/US2010/058707, dated Feb. 1, 2011, (8 pages).
International Search Report and the Written Opinion for International Application No. PCT/US2010/058705, dated Feb. 11, 2011, (12 pages).

* cited by examiner

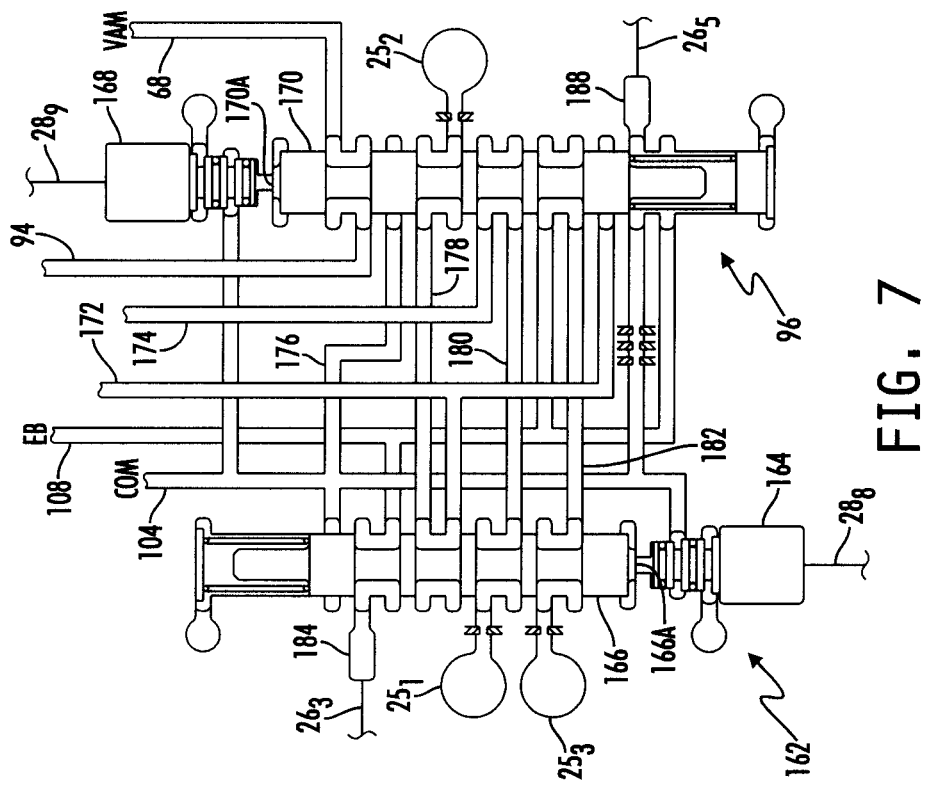
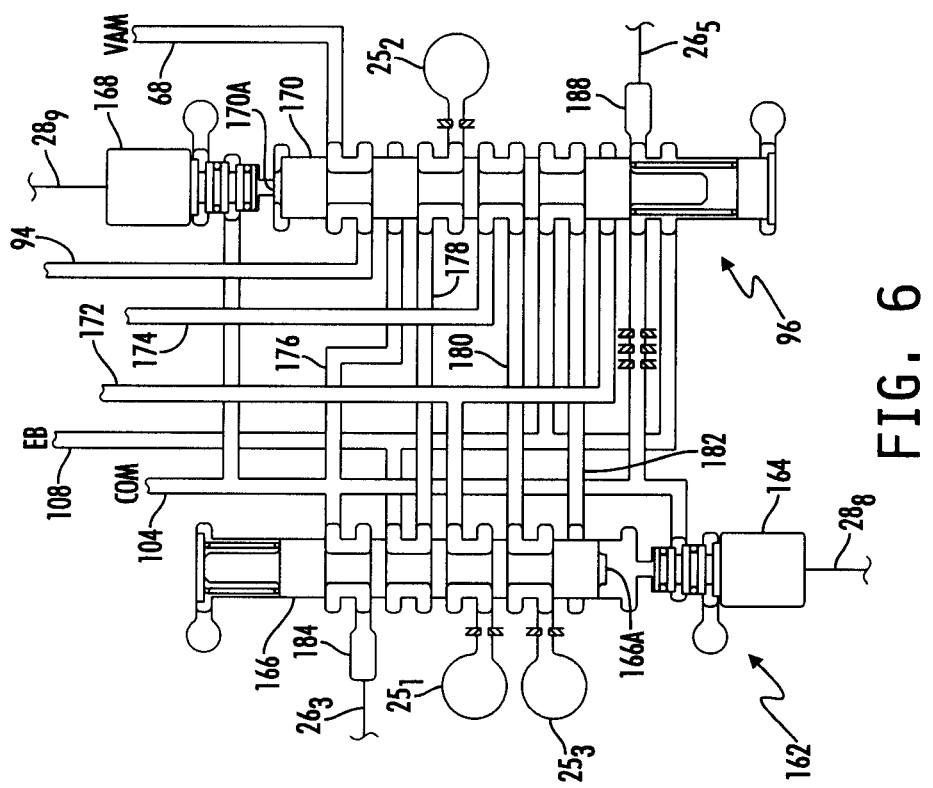

SYSTEM AND METHOD FOR MULTIPLEXING GEAR ENGAGEMENT CONTROL AND PROVIDING FAULT PROTECTION IN A TOROIDAL TRACTION DRIVE AUTOMATIC TRANSMISSION

CROSS-REFERENCE TO RELATED APPLICATION

This application is a continuation application of U.S. application Ser. No. 12/957,877, entitled "SYSTEM AND METHOD FOR MULTIPLEXING GEAR ENGAGEMENT CONTROL AND PROVIDING FAULT PROTECTION IN A TORODIAL TRACTION DRIVE AUTOMATIC TRANSMISSION," which was filed on Dec. 1, 2010, and which claims priority to U.S. Provisional Patent Application No. 61/287,038, filed Dec. 16, 2009, the entirety of both of which is incorporated herein by reference.

FIELD OF THE INVENTION

The present invention relates generally to continuously variable transmissions including a variator, and more specifically to systems and methods for multiplexing gear engagement control and providing fault protection in such transmissions.

BACKGROUND

Toroidal traction drive automatic transmissions may include a variator, one or more gear sets and a number of selectively engageable friction devices that cooperate together to transfer drive torque from a power plant to one or more loads. It is desirable to multiplex gear engagement control in such transmissions, and to provide fault protection for one or more faults or failure conditions.

SUMMARY

The present invention may comprise one or more of the features recited in the attached claims, and/or one or more of the following features and combinations thereof. An apparatus for multiplexing gear engagement control in an automatic transmission may comprise at least two friction engagement devices each configured to selectively engage and disengage a different gear ratio of the transmission, a trim system configured to selectively supply engagement and disengagement pressures to at least one fluid passageway, and a first control valve fluidly coupled directly to the at least one fluid passageway and directly to each of the at least two friction engagement devices. The first control valve may be configured to selectively route the engagement and disengagement pressures through the first control valve directly to the at least two friction devices.

The at least one fluid passageway may comprise a first fluid passageway and a second fluid passageway separate from the first fluid passageway. The trim system may be configured to selectively supply the engagement and disengagement pressures to the first fluid passageway and to selectively supply the engagement and disengagement pressures to the second fluid passageway independently from the first fluid passageway. The first control valve may be fluidly coupled directly to the first fluid passageway.

The apparatus may further comprise a second control valve fluidly coupled directly to each of the first and second fluid passageways. The second control valve may be configured to selectively route the engagement and disengagement pressures in the first and second fluid passageways through the second control valve to the first control valve for further selective routing by the first control valve to each of the at least two friction devices.

The apparatus may further comprise a third friction device configured to selectively engage and disengage another different gear ratio of the transmission. The second control valve may be fluidly coupled directly to the third friction device. The second control valve may be configured to selectively route the engagement and disengagement pressures in the second fluid passageway through the second control valve directly to the third friction device.

The first control valve is configured to selectively route the engagement and disengagement pressures in the first fluid passageway through the first control valve to the second control valve for further selective routing by the second control valve to the third friction device.

The first control valve may comprise a first spool having a stroked position and a de-stroked position and the second control valve may comprise a second spool having a stroked position and a de-stroked position. The first and second valves may together be configured to supply the engagement pressure in at least one of the first and second fluid passageways to at least one of the three friction engagement devices to thereby engage the at least one of the three friction engagement devices in all possible position combinations of the first and second spools.

The second control valve may be fluidly coupled directly to a first main pressure fluid passageway and also directly to a third fluid passageway. The second control valve may be configured to selectively route pressure in the first main pressure fluid passageway to the third fluid passageway. The second control valve may be fluidly coupled directly to a second main pressure fluid passageway. The second control valve may be configured to selectively route pressure in the second main pressure fluid passageway to the third fluid passageway.

The automatic transmission may be a toroidal traction drive transmission. The toroidal traction drive transmission may comprise a variator and a variator control system for controlling operation of the variator. The second control valve may be configured to selectively route pressure in the first and second main pressure fluid passageways to a component of the variator control system via the third fluid passageway.

An apparatus for multiplexing gear engagement control in an automatic transmission may comprise three friction engagement devices each configured to selectively engage and disengage a different gear ratio of the transmission, a trim system configured to selectively supply engagement and disengagement pressures to at least one fluid passageway, a first control valve fluidly coupled directly to the at least one fluid passageway and directly to each of two of the three friction engagement devices, and a second control valve fluidly coupled directly to the at least one fluid passageway and directly coupled to the third friction device. The first control valve may be configured to selectively route the engagement and disengagement pressures through the first control valve directly to the at least two friction devices. The second control valve may be configured to selectively route the engagement and disengagement pressures through the second control valve directly to the third friction device.

The first and second control valves may each include an actuator responsive to a separate control signal to independently control the first and second valves between stroked and de-stroked states to thereby define four separate combinations of operating states of the first and second valves.

The transmission may define three different operating modes with a different one of the three friction devices engaged during each of the three different operating modes.

The at least one fluid passageway may comprise a first fluid passageway and a second fluid passageway separate from the first fluid passageway. The trim system may be configured to supply the engagement pressures to each of the first and second fluid passageways during transitions between the three different operating modes of the transmission to thereby engage two of the three friction engagement devices during the transitions.

Two of the four separate combinations of operating states of the first and second control valves may be possible during normal transitions between the three different operating modes of the transmission. The remaining two of the four separate combinations of operating states of the first and second control valves may represent fault conditions.

The first and second control valves may be configured to route the engagement pressure to at least one of the three friction engagement devices during the fault conditions to thereby selectively engage at least one of the different gear ratios of the transmission during the fault conditions.

The first and second control valves may be configured to route the engagement pressure to two of the three friction engagement devices during the fault conditions.

An apparatus for multiplexing gear engagement control in a toroidal traction drive automatic transmission may comprise at least two friction engagement devices each configured to selectively engage and disengage a different gear ratio of the transmission, a trim system configured to selectively supply engagement and disengagement pressures to at least one fluid passageway, and a first control valve fluidly coupled directly to the at least one fluid passageway and directly to each of the at least two friction engagement devices. The first control valve may be configured to selectively route the engagement and disengagement pressures through the first control valve directly to the at least two friction devices. The toroidal traction drive transmission may further comprise a variator and a variator control system for controlling operation of the variator.

The apparatus may further comprise a third friction device configured to selectively engage and disengage another different gear ratio of the transmission, and a second control valve fluidly coupled directly to the at least one fluid passageway, directly to the third friction device, and directly to a first main pressure fluid passageway. The second control valve may be configured to selectively route the engagement and disengagement pressures through the second control valve directly to the third friction device. The second control valve may further be configured to selectively route pressure in the first main pressure fluid passageway to a component of the variator control system.

The second control valve may further be configured to selectively route pressure in a second main pressure fluid passageway to the component of the variator control system.

BRIEF DESCRIPTION OF THE DRAWINGS

FIG. 6 is a magnified view of the clutch control valves illustrated in FIG. 3 showing yet another operating state thereof.

FIG. 7 is a magnified view of the clutch control valves illustrated in FIG. 3 showing still another operating state thereof.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

Figure 1:
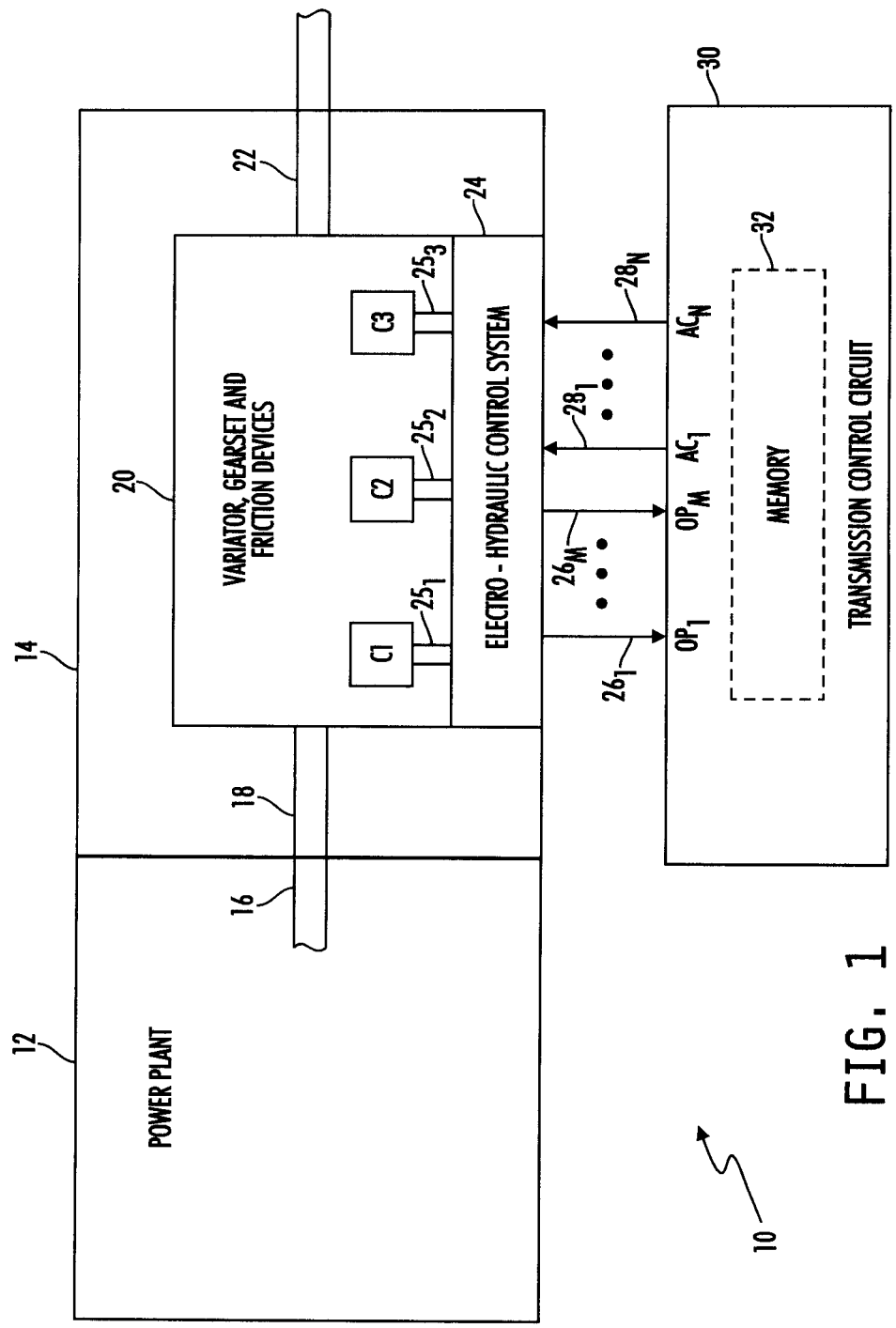
FIG. 1 is a block diagram of one illustrative embodiment of a system for controlling operation of a toroidal traction drive automatic transmission.

Referring now to FIG. 1, a block diagram is shown of one illustrative embodiment of a system 10 for controlling operation of a toroidal traction drive automatic transmission 14. In the illustrated embodiment, a power plant or energy center 12 is coupled to an automatic transmission 14 such that a rotatable output shaft 16 of the power plant 12 is coupled to a rotatable input shaft 18 of the transmission 14 in a conventional manner. The input shaft 18 is coupled, in the illustrated embodiment, to a combination variator and gear set 20 that further includes a plurality of selectively engageable friction devices, e.g., one or more conventional, selectively engageable clutches or the like, and an output of the combination variator and gear set 20 is coupled to a rotatable output shaft 22. The combination variator and gear set 20 is illustratively controlled by an electro-hydraulic control system 24, some of the details of which will be described in greater detail hereinafter.

The power plant 12 is generally an apparatus that produces rotational drive power at the output shaft 16. Examples of the power plant 12 include, but should not be limited to, one or any combination of a one or more engines, such as an internal combustion engine of the spark ignited, compression ignition or other variety, a steam engine, or type of engine that produces mechanical energy from one or more other fuel sources, one or more electrical generators, and the like.

Figure 2A:
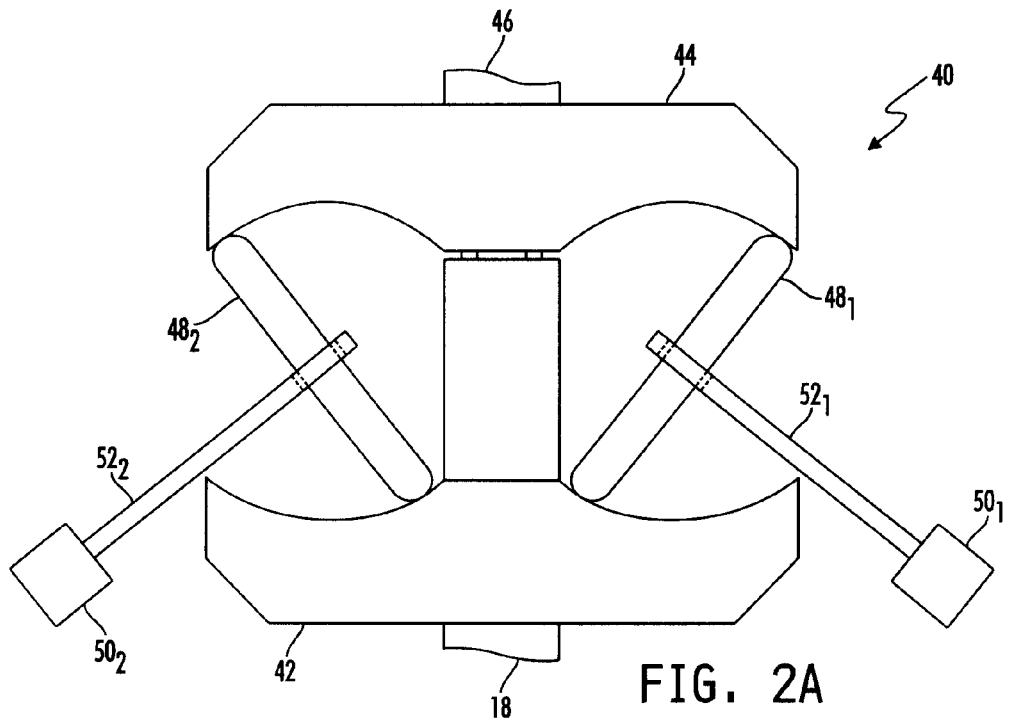
FIG. 2A is a diagram illustrating operation of one illustrative embodiment of a variator that forms part of the toroidal traction drive automatic transmission illustrated in FIG. 1.
Figure 2B:
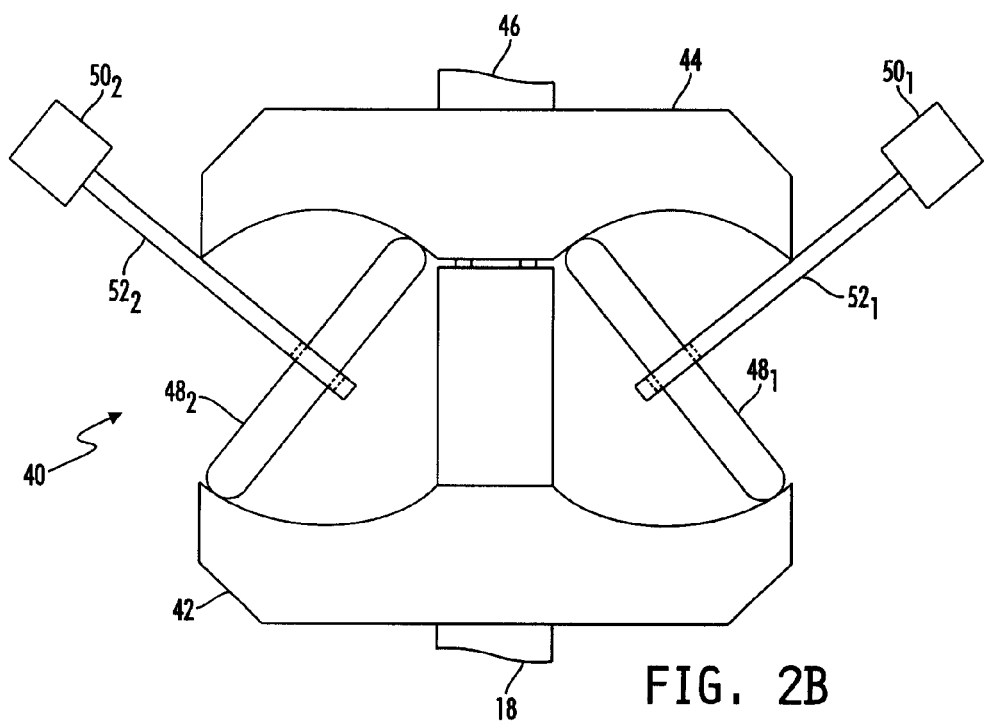
FIG. 2B is a diagram further illustrating operation of the variator of FIG. 2A.

The combination variator and gear set 20 illustratively includes a conventional full-toroidal, traction-drive variator that is coupled to a conventional gear set. Referring to FIGS. 2A and 2B, one illustrative embodiment of some of the structural features of such a full-toroidal, traction-drive variator 40 is shown. In the illustrated embodiment, the variator 40 includes a pair of opposing, toroidal-shaped disks 42 and 44 that rotate independently of each other. For example, the disk 42 is rigidly coupled to the input shaft 18 of the transmission 14 such that the disk 42 is rotatably driven by the power plant 12. The disk 44 is rigidly coupled to an output shaft 46 of the variator 40, and is rotatably coupled to the shaft 18 such that the disk 44 rotates freely about the shaft 18. The output shaft 46 of the variator 40 is coupled directly, or indirectly through one or more transmission gears, to the output shaft 22 of the transmission 14 such that output shaft 46 of the variator 40 drives one or more wheels of a vehicle (not shown) carrying the power plant 12 and transmission 14.

A number of rollers 48 are illustratively positioned between opposing inner, arcuate-shaped surfaces of the disks 42 and 44, and a traction fluid (not shown) is disposed between the rolling surface of each such roller 48 and the inner surfaces of the disks 42 and 44. In the illustrated embodiment, the rolling surfaces of the various rollers 48 therefore do not contact, in a structural sense, the inner surface of either disk 42, 44; rather torque is transmitted by the various rollers 48 between the two disks 42, 44 via the traction fluid. It is because torque is transferred between the two disks 42, 44 via the traction fluid and not via structural contact between the rolling surfaces of the rollers 48 and the arcuate inner surfaces of the disks 42, 44 that the variator is referred to as a traction-drive apparatus.

In the embodiment illustrated in FIGS. 2A and 2B, two such rollers $48_1$ and $48_2$ are shown operatively positioned between the opposing inner surfaces of the two disks 42, 44. A roller actuator $50_1$, e.g., in the form of a conventional hydraulically actuated piston, is coupled to the roller $48_1$ via a bracket $52_1$, and another roller actuator $50_2$, e.g., in the form of another conventional hydraulically actuated piston, is coupled to the roller $48_2$ via a bracket $52_2$. It will be understood that the brackets $52_1$ and $52_2$ do not represent rotatable shafts about which the rollers $48_1$ and $48_2$ may be rotatably driven. Rather, the brackets $52_1$ and $52_2$ represent structures about which the rollers $48_1$ and $48_2$ rotate. In one actual implementation, for example, the brackets $52_1$ and $52_2$ are configured to attach to the central hub of the rollers $48_1$ and $48_2$ on either side thereof such that the brackets $52_1$ and $52_2$ and actuators $50_1$ and $50_2$ would extend generally perpendicular to the page illustrating FIGS. 2A and 2B.

The hydraulically controlled actuators $50_1$ and $50_2$ are each illustratively controllable, by selectively controlling a high-side hydraulic pressure applied to one side of the actuator and a low-side hydraulic pressure applied to the opposite side of the actuator, to thereby control torque transferred from a corresponding roller $48_1$, $48_2$ relative to the inner, annular surfaces of the two disks 42, 44. The actuators $50_1$ and $50_2$ illustratively control driveline torque rather than the position or pitch of the rollers $48_1$ and $48_2$. The rollers $48_1$ and $48_2$ are free-castoring, and are responsive to the actuators $50_1$ and $50_2$ to seek a position that provides the correct ratio match of engine and drive train speeds based on input energy equaling output energy.

In one illustrative implementation, the variator 40 includes two sets or pairs of disks 42 and 44, with the pairs of the disks 42 rigidly coupled to each other and with the pairs of the disks 44 also rigidly coupled to each other, such that the embodiment illustrated in FIGS. 2A and 2B represents one-half of such an implementation. In this illustrative implementation, three rollers are positioned between each opposing set of disks 42, 44 for a total of six rollers $48_1$-$48_6$ and six corresponding hydraulically controlled actuators $50_1$-$50_6$. It will be understood, however, that this particular implementation of the variator 40 is shown and described only by way of example, and that other embodiments of the variator 40 that include more or fewer pairs of disks 42, 44, that include more or fewer rollers 48 and hydraulically controlled actuators 50, and/or that are configured to be only partially toroidal in shape, may alternatively be used. It will further be understood that while the operation of the variator 40 illustrated and described herein as being generally hydraulically controlled, this disclosure contemplates embodiments in which operation of the variator 40 is controlled via purely electronic or electro-mechanical structures.

Referring again to FIG. 1, the gear set within the combination variator and gear set 20 illustratively includes one or more conventional planetary gear set(s) and/or other gear set(s) that define(s) at least two automatically selectable gear ratios and that is coupled to, or integrated with, the variator, e.g., the variator 40 illustrated and described with respect to FIG. 2. The combination variator and gear set 20 further illustratively includes a number of conventional friction devices, e.g., clutches, which may be selectively controlled to thereby control shifting of the transmission 14 between the two or more gear ratios. In alternate embodiments, the gear set may include more than one planetary gear set, one or more planetary gear sets in combination with one or more other conventional gear sets, or exclusively one or more non-planetary gear sets.

In the example embodiment illustrated in FIG. 1, the transmission 14 includes three friction devices, e.g., in the form of three conventional clutches C1, C2 and C3. In this embodiment, each clutch C1, C2 and C3 is operated in a conventional manner, e.g., via fluid pressure, under the control of the electro-hydraulic control system 24. In this regard, a fluid path $25_1$ is fluidly coupled between the electro-hydraulic control system 24 and the clutch C1, a fluid path $25_2$ is fluidly coupled between the electro-hydraulic control system 24 and the clutch C2, and a fluid path $25_3$ is fluidly coupled between the electro-hydraulic control system 24 and the clutch C3. The gear set and the clutches C1, C2 and C3 are illustratively arranged to provide four separate modes of operation of the transmission 14, and the various operating modes of the transmission 14 are selectively controlled by the operation of the clutches C1, C2 and C3.

In a first operating mode, M1, for example, the clutch C1 is applied, e.g., engaged, while the clutches C2 and C3 are released, e.g., disengaged, and in this mode forward or reverse launch can be accomplished, and the vehicle carrying the transmission 14 can be operated at vehicle speeds up to about 10 miles per hour. In a second operating mode, M2, as another example, the clutch C2 is engaged while the clutches C1 and C3 are disengaged, and in this mode the vehicle can be operated at vehicle speeds in the range of about 10-30 miles per hour. In a third operating mode, M3, as yet another example, the clutch C3 is engaged while the clutches C1 and C2 are disengaged, and in this mode the vehicle can be operated at vehicle speeds greater than about 30 miles per hour. In a fourth mode, M0, as a final example, the clutches C1, C2 and C3 are all disengaged, and in this mode the transmission 14 is in neutral. In one embodiment of the electro-hydraulic control system 24 illustrated in FIG. 1, as will be described in greater detail hereinafter, two neutral conditions are possible; namely an in-range neutral and a so-called "true neutral." In the transitional states between the various operating modes M1, M2 and M3, the variator torque is illustratively reversed to assist transitions from one operating mode to the next.

The system 10 further includes a transmission control circuit 30 that controls and manages the overall operation of the transmission 14. The transmission control circuit 30 includes a number, M, of operating parameter inputs, $OP_1$-$OP_M$, that are electrically connected to corresponding operating parameter sensors included within the electro-hydraulic control system 24 via corresponding signal paths $26_1$-$26_M$, wherein M may be any positive integer. The one or more operating parameter sensors included within the electro-hydraulic control system 24, examples of which will be described hereinafter, produce corresponding operating parameter signals on the signal paths $26_1$-$26_M$, which are received by the transmission control circuit 30. The transmission 14 further includes a number, N, of electrically controllable actuators included within the electro-hydraulic control system 24 that are each electrically connected to different one of a corresponding number of actuator control outputs, $AC_1$-$AC_N$ of the transmission control circuit 30 via corresponding signal paths $28_1$-$28_N$, wherein N may be any positive integer. The one or more electrically controllable actuators included within the electro-hydraulic control system 24, examples of which will be described hereinafter, are responsive to actuator control signals produced by the transmission control circuit 30 on the corresponding signal paths $28_1$-$28_N$ to control various operational features of the transmission 14.

Illustratively, the transmission control circuit 30 is microprocessor-based, and includes a memory unit 32 having instructions stored therein that are executable by the control circuit 30 to control operation of the transmission 14 generally, and more specifically to control operation of the electro-hydraulic control system 24 as will be described herein. It will be understood, however, that this disclosure contemplates other embodiments in which the transmission control circuit 30 is not microprocessor-based, but is configured to control operation of the transmission 14 generally and operation of the electro-hydraulic system 24 more specifically, based on one or more sets of hardwired instructions and/or software instructions stored in the memory unit 32.

Figure 3:
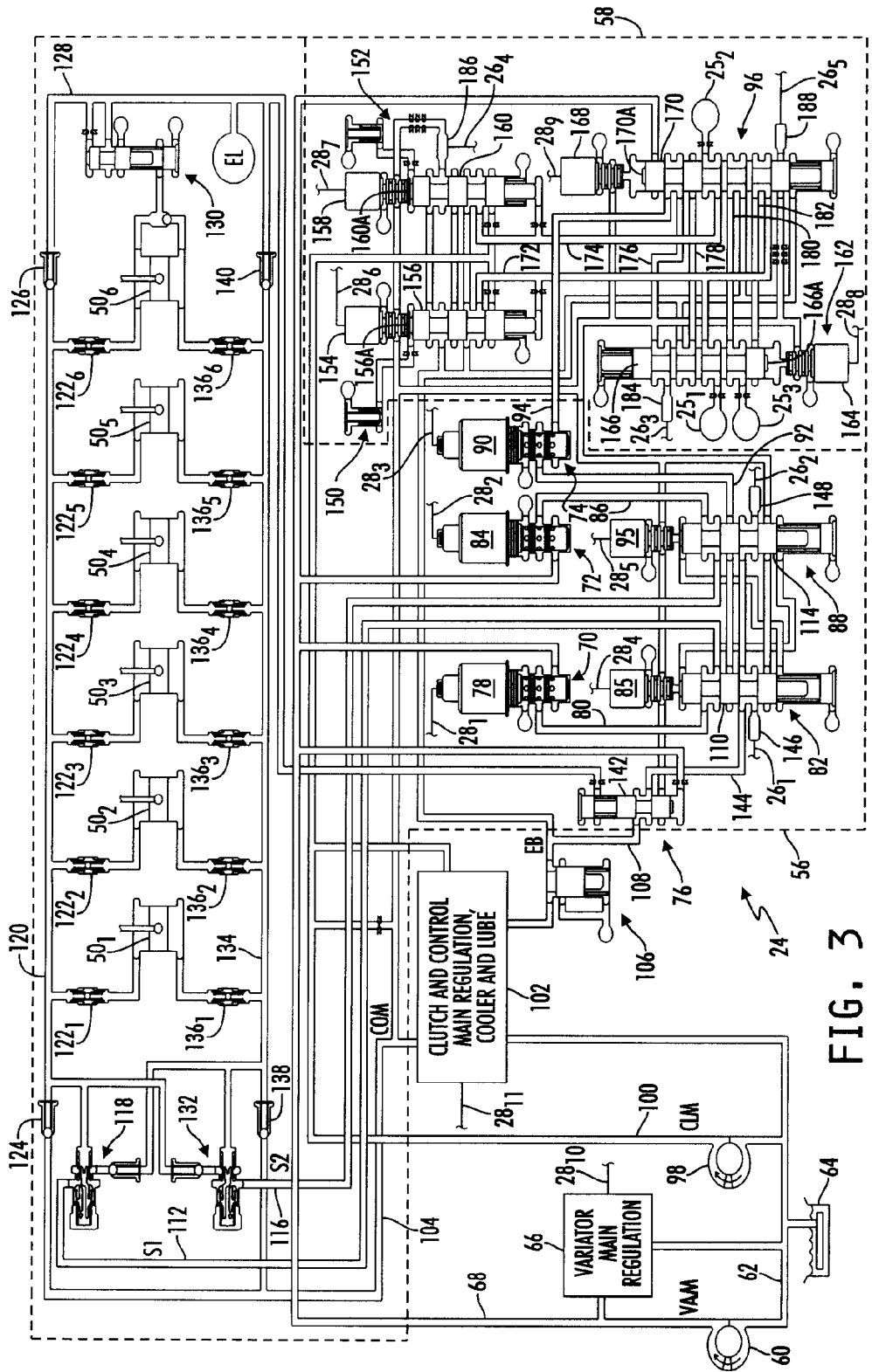
FIG. 3 is a schematic diagram of one illustrative embodiment of the electro-hydraulic control system that forms part of the toroidal traction drive automatic transmission illustrated in FIG. 1.

Referring now to FIG. 3, a schematic diagram is shown of one illustrative embodiment of the electro-hydraulic control system 24 of FIG. 1. In the illustrated embodiment, the electro-hydraulic control system 24 is roughly divided in two separate control sections; a variator control section 56 and a clutch control section 58. A conventional fluid pump 60 is configured to supply transmission fluid, e.g., conventional transmission oil, to the variator control section 56 from a source 64 of transmission fluid, e.g., a conventional transmission sump. In the illustrated embodiment, a fluid inlet of the fluid pump 60 fluidly coupled to the sump 64 via a fluid passageway 62. A fluid outlet of the pump 60 is fluidly coupled to an inlet of a variator main regulation block 66 via a variator main fluid passageway 68 (VAM), and one of the output signal paths $28_{10}$ of the control circuit 30 is electrically connected to the variator main regulation block 66. The variator main regulation block 66 includes conventional components, e.g., one or more valves, responsive to a control signal produced on the signal path $28_{10}$ by the transmission control circuit 30 to supply pressure-regulated transmission fluid to the fluid passageway 68 in a conventional manner.

The variator main fluid passageway 68 is fluidly coupled to fluid inlets of two variator trim valves 70 and 72, to one end of a variator fault valve 76 and also to a clutch control valve 96 located in the clutch control section 58 of the electro-hydraulic control system 24. The variator trim valves 70 and 72 each include an actuator 78 and 84 respectively that is electrically connected to the transmission control circuit 30 via a signal path $28_1$ and $28_2$ respectively. Another fluid inlet of each variator trim valve 70 and 72 is fluidly coupled to exhaust. A fluid outlet of the variator trim valve 70 is fluidly coupled to a variator control valve 82 via a fluid passageway 80, and a fluid outlet of the variator trim valve 72 is fluidly coupled to another variator control valve 88 via a fluid passageway 86. In the illustrated embodiment, the actuators 78 and 84 are illustratively conventional electronically actuated solenoids, and the trim valves 70 and 72 are illustratively variable-bleed valves that supply variable-pressure transmission fluid to the fluid passageways 80 and 86 respectively based on control signals produced by the transmission control circuit 30 on the signal paths $28_1$ and $28_2$ respectively.

The variator control section 56 of the electro-hydraulic control system 24 further includes another variator trim valve 74 including an actuator 90 that is electrically connected to the transmission control circuit 30 via a signal path $28_3$. One fluid inlet of the trim valve 74 is fluidly coupled to the clutch control valve 96 via a fluid path 94, and another fluid inlet of the variator trim valve 74 is fluidly coupled to exhaust. A fluid outlet of the variator trim valve 74 is fluidly coupled to the variator control valves 82 and 88 via a fluid passageway 92. The actuator 90 illustratively a conventional electronically actuated solenoid, and the trim valve 74 is illustratively a variable-bleed valve that supplies variable-pressure transmission fluid to the fluid passageway 92 based on control signals produced by the transmission control circuit 30 on the signal path $28_3$.

Another conventional fluid pump 98 is configured to supply transmission fluid from the sump 64 to the clutch control section 58 of the electro-hydraulic control system 24. In the illustrated embodiment, a fluid inlet of the fluid pump 98 is fluidly coupled to the sump 64 via the fluid passageway 62, and fluid outlet of the pump 98 is fluidly coupled to a fluid inlet of a clutch and control main regulation, cooler and lube block 102 via a fluid passageway 100. Another one of the output signal paths $28_{11}$ of the control circuit 30 is electrically connected to the clutch and control main regulation, cooler and lube block 102. The clutch and control main regulation, cooler and lube block 102 illustratively includes conventional components, e.g., one or more valves, responsive to a control signal produced on the signal path $28_{11}$ by the transmission control circuit 30 to supply pressure-regulated transmission fluid to the clutch main, CLM, fluid passageway 100 and to a control main, COM, fluid passageway 104 in a conventional manner. The control main, COM, fluid passageway 104 is further fluidly coupled to the variator control valves 82 and 88.

An exhaust backfill valve 106 establishes an exhaust backfill pressure, EB, in an exhaust backfill fluid passageway 108 that is also fluidly coupled to the clutch and control main regulation, cooler and lube block 102 and also to the variator fault valve 76. The clutch and control main regulation, cooler and lube block 102 further includes conventional components for cooling and filtering the transmission fluid and for providing lubrication paths to the variator and to the various gears of the gear set of the transmission 14.

The variator control valves 82 and 88 each include an actuator 85 and 95 respectively that is electrically connected to the transmission control circuit 30 via a signal path $28_4$ and $28_5$ respectively. In the illustrated embodiment, the actuators 85 and 95 are illustratively conventional electronically actuated solenoids. The variator control valve 82 further includes a spool 110, and the actuator 85 is responsive to control signals produced by the transmission control circuit 30 on the signal path $28_4$ to selectively control the position of the spool 110 to thereby selectively control fluid pressure in a fluid passageway 112. The variator control valve 88 likewise includes a spool 114, and the actuator 95 is responsive to control signals produced by the transmission control circuit 30 on the signal path $28_5$ to selectively control the position of the spool 114 to thereby selectively control fluid pressure in a fluid passageway 116. For purposes of this document, the fluid paths 112 and 116 may be referred to herein as S1 and S2 respectively.

The S1 fluid path (112) is fluidly coupled to one end of a conventional damper 118, an opposite end of which is fluidly coupled to a variator high-side fluid passageway 120. In the embodiment illustrated in FIG. 3, the variator includes six actuators, $50_1$-$50_6$, e.g., conventional pistons, and the variator high-side fluid passageway 120 is fluidly coupled to one side, e.g., a high side, of each such actuator $50_1$-$50_6$ via a corresponding conventional damper $122_1$-$122_6$. A conventional check valve 124 is interposed between the variator high-side fluid passageway 120 and the control main (COM) fluid path 104, and another conventional check valve 126 is interposed between the variator high-side fluid passageway 120 and an endload fluid passageway 128.

The S2 fluid path (116) is similarly fluidly coupled to one end of another conventional damper 132, an opposite end of which is fluidly coupled to a variator low-side fluid passageway 134. The variator low-side fluid passageway 134 is fluidly coupled to an opposite side, e.g., a low side, of each actuator $50_1$-$50_6$ of the variator via a corresponding conventional damper $136_1$-$136_6$. A conventional check valve 138 is interposed between the variator low-side fluid passageway 134 and the control main (COM) fluid path 104, and another conventional check valve 140 is interposed between the variator low-side fluid passageway 134 and the endload fluid passageway 128. The endload fluid passageway 128 is fluidly coupled to an endload relief valve 130, which is further fluidly coupled between the high side and the low side of the actuator $50_6$. Further details relating to one illustrative structure and method of operating the endload relief valve 130 are provided in co-pending U.S. Patent Application Ser. No. 61/287,020, the disclosure of which is incorporated herein by reference in its entirety.

The endload fluid passageway 128 is further fluidly coupled to an opposite end of the variator fault valve 76. The variator fault valve 76 illustratively includes a spool 142, and is fluidly coupled to the variator control valves 82 and 88 via a fluid passageway 144. The spool 142 of the variator fault valve 76 is responsive to a difference in pressure between the variator main fluid passageway 68 at one end and the endload fluid passageway 128 at its opposite end to supply a selectable fluid pressure to the fluid passageway 144. In the embodiment illustrated in FIG. 3, for example, if the fluid pressure in the variator main fluid passageway 68 is sufficiently greater than that in the endload fluid passageway 128, the spool 144 is forced upwardly and thereby fluidly couples the exhaust backfill fluid passageway (EB) 108 to the fluid passageway 144. This is the position of the spool 142 illustrated in FIG. 3. If instead the fluid pressure in the endload fluid passageway 128 is sufficiently greater than that in the variator mail fluid passageway 68, the spool 144 is forces downwardly and thereby fluidly couples the control main (COM) fluid passageway 104 to the fluid passageway 144. Illustratively, the variator fault valve 76 is designed to have a specified amount of hysteresis between the two extreme positions of the spool 142, and in one embodiment the hysteresis is approximately 15-20% such that the differential pressure between VAM 68 and the endload fluid passageway 128 must be greater than about 15-20% before the spool 142 changes position. Those skilled in the art will appreciate that this hysteresis value is provided only by way of example and that other hysteresis values, or no hysteresis value, may alternatively be used.

In the illustrated embodiment, sensors are operatively positioned relative to each of the variator control valves 82 and 88 to enable monitoring of the operating states of each of these valves. In one illustrative embodiment, the sensors are provided in the form of conventional pressure switches, although it will be understood that a conventional pressure sensor may be substituted for any one or more of the pressure switches. In any case, each of the pressure switches is electrically connected to the transmission control circuit 30 to allow monitoring by the transmission control circuit 30 of the states of the pressure switches and thus the operating states of the valves 82 and 88. In the embodiment illustrated in FIG. 3, for example, a pressure switch 146 is fluidly coupled to the variator control valve 82, and is electrically connected to the transmission control circuit 30 via one of the signal paths $26_1$.

Another pressure switch 148 is fluidly coupled to the variator control valve 88, and is electrically connected to the transmission control circuit 30 via another one of the signal paths $26_2$. The transmission control circuit 30 is operable to process the signals produced by the pressure switch 146 and 148 in a known manner to determine corresponding operating states, i.e., whether activated or deactivated, of the valves 82 and 88. Further details relating to the structure and operation of the variator control section 56 generally, and to the operation of and fault conditions associated with the valves 70, 72, 74, 82 and 88 in particular, are provided in co-pending U.S. Patent Application Ser. No. 61/286,974, in co-pending U.S. Patent Application Ser. No. 61/286,984, and in co-pending U.S. Patent Application Ser. No. 61/287,003, the disclosures of which are all incorporated herein by reference in their entirety.

In the embodiment illustrated in FIG. 3, the clutch main pressure (CLM) is illustratively supplied via the fluid passageway 100 to the clutch control section 58 of the electro-hydraulic control system 24. In particular, the clutch main fluid pressure, CLM, is fluidly applied via the clutch main fluid passageway 100 is fluidly to each of a pair of clutch trim valves 150 and 152. Together the clutch trim valves 150 and 152 may be referred to herein as a trim system. The clutch trim valves 150 and 152 each illustratively include an actuator 154 and 158 respectively that is electrically connected to the transmission control circuit 30 via a signal path $28_6$ and $28_7$ respectively. One control fluid inlet of each of the clutch trim valves 150 and 152 is fluidly coupled to the control main fluid passageway 104, and another control fluid inlet of each clutch trim valve 150 and 152 is fluidly coupled to exhaust. Each trim valve 150 and 152 further includes a movable spool 156 and 160 respectively that is movable between two spool positions based on fluid pressure applied to control ends 156A and 160A respectively thereof. In the illustrated embodiment, the actuators 154 and 158 are illustratively conventional electronically actuated solenoids. The trim valves 150 and 152 are each configured to selectively supply control main (COM) pressure or exhaust to the control ends 156A and 160A of the spools 156 and 160 respectively based on control signals produced by the transmission control circuit 30 on the signal paths $28_6$ and $28_7$ respectively to thereby move the spools 156 and 160 respectively between their two spool positions. The clutch trim valves 150 and 152 are further fluidly coupled to each other via a number of fluid passageways, and the exhaust backfill, EB, fluid passageway 108 is fluidly coupled directly to the trim valve 150 and indirectly to the trim valve 152 via the trim valve 150.

Fluid outlets of each of the clutch trim valves 150 and 152 are fluidly coupled to fluid inlets of each of a pair of clutch control valves 162 and 96 via fluid passageways 172 and 174 respectively. The clutch trim valves 150 and 152 are each configured to selectively, i.e., under the control of the transmission control circuit 30 via signals produced by the transmission control circuit 30 on the signal paths $28_6$ and $28_7$ respectively, supply a clutch engagement pressure, e.g., the clutch main pressure, CLM, and a clutch disengagement pressure, e.g., exhaust backfill, EB, independently to the fluid passageways 172 and 174.

The clutch control valves 162 and 96 each illustratively include an electronic actuator, e.g., an electrically controlled solenoid, 164 and 168 respectively that is electrically connected to the transmission control circuit 30 via a signal path $28_8$ and $28_9$ respectively. One control fluid inlet of each clutch control valve 162 and 96 is fluidly coupled to the control main, COM, fluid passageway 104, and another control fluid inlet is fluidly coupled to exhaust. Each valve 162 and 96 is responsive to a control signal produced by the transmission control circuit 30 on the signal path $28_8$ and $28_9$ respectively to selectively apply the control main pressure, COM, or exhaust to a control end 166A and 170A respectively of a spool 166 and 170 respectively carried by each valve 162 and 96 to thereby move the spools 166 and 170 between two spool positions. The clutch control valves 162 and 96 are further fluidly coupled to each other via fluid passageways 176, 178, 180 and 182. The control main pressure, COM, fluid passageway 104 is also fluidly coupled directly to the other portions of each clutch control valve 162 and 96, and the exhaust backfill, EB, fluid passageway 108 is fluidly coupled directly to each of the clutch control valves 162 and 96.

The clutch control valve 96 is further fluidly coupled directly to the C2 clutch fluid path $25_2$, and clutch main fluid, CLM, or exhaust backfill, EB, is selectively applied to the C2 clutch via the fluid path $25_2$ via various combinations of states of the actuators 154, 158, 164 and 168. The clutch control valve 162 is further fluidly coupled directly to each of the C1 and C3 clutch fluid paths $25_1$ and $25_3$, and clutch main fluid, CLM, or exhaust backfill, EB, is selectively routed through the clutch control valve 162 to the C1 clutch via the fluid passageway $25_1$ or to the C3 clutch via the fluid passageway $25_3$ via various combinations of states of the actuators 154, 158, 164 and 168. The clutches C1-C3 are thus selectively activated, i.e., engaged, and deactivated, i.e., disengaged, based on the operating states of the actuators 154, 158, 164 and 168 of the clutch trim valves 150 and 152 and the clutch control valves 162 and 96 respectively, by selectively routing the CLM and EB pressures through the control valves 162 and 96 to the various clutches C1-C3. The clutch control valve 96 is directly fluidly coupled to the clutch C2 via the fluid passageway $25_2$, and control, i.e., engagement and disengagement, of the C2 clutch must therefore include appropriate control of the clutch control valve 96 to selectively route the CLM and EB pressures to the clutch C2. The clutch control valve 162, on the other hand, is directly fluidly coupled to the clutches C1 and C3 via the fluid passageways $25_1$ and $25_3$ respectively, and control, i.e., engagement and disengagement, of the clutches C1 and C3 must therefore include appropriate control of the clutch control valve 162 to selectively route the CLM and EB pressures to the clutches C1 and C3. Because the clutches C1 and C3 are never, during normal operation of the transmission 14, engaged simultaneously, control of the clutches C1 and C3 can therefore be multiplexed via the clutch control valve 162.

In the illustrated embodiment, sensors are operatively positioned relative to the clutch trim valves 150 and 152 and each of the clutch control valves 162 and 96 to enable monitoring of the operating states of each of the valves 150, 152, 162 and 96 and to further monitor certain transmission operating state faults. In one illustrative embodiment, such sensors are provided in the form of conventional pressure switches, although it will be understood that a conventional pressure sensor may be substituted for any one or more of the pressure switches. In any case, each of the pressure switches is electrically connected to the transmission control circuit 30 to allow monitoring by the transmission control circuit 30 of the states of the pressure switches and thus the operating states of the each of the valves 150, 152, 162 and 96 and of certain transmission operating state faults. In the embodiment illustrated in FIG. 3, for example, a pressure switch 184 is fluidly coupled to the clutch control valve 162, and is electrically connected to the transmission control circuit 30 via one of the signal paths $26_3$. Another pressure switch 186 is fluidly coupled to the clutch trim valves 150 and 152, and is electrically connected to the transmission control circuit 30 via another one of the signal paths $26_4$. Still another pressure switch 188 is fluidly coupled to the clutch control valve 96, and is electrically connected to the transmission control circuit 30 via another one of the signal paths $26_5$. The transmission control circuit 30 is operable to process the signals produced by the pressure switches 184, 186 and 188 to determine corresponding operating states, i.e., whether activated or deactivated, of the various valves 150, 152, 162 and 96 and of certain transmission operating state faults. Further details relating to methods for processing the signals produced by the pressure switches 184, 186 and 188 to monitor fault states associated with the valves 152, 162 and 96 and to monitor certain transmission operating state faults are provided in co-pending U.S. Patent Application Ser. No. 61/287,031, the disclosure of which is incorporated herein by reference in its entirety.

Referring now to FIGS. 4-7, magnified views of the four possible operating states of the clutch control valves 162 and 96 are shown. During normal operation of the transmission 14 in any of the operating modes M1-M3 described above, except during neutral, one of the clutches C1-C3 is engaged. However, during mode transitions, e.g., 1-2 or 2-3, two clutches are simultaneously engaged for at least a short time period while the oncoming clutch engages and the off-going clutch disengages. During such mode transitions, both of the clutch trim valves 150 and 152 are activated, i.e., stroked, such that the clutch trim valve 150 supplies the clutch main pressure, CLM, to the fluid passage 172 and the clutch trim valve 152 likewise supplies the clutch main pressure, CLM, to the fluid passage 174.

Figure 4:
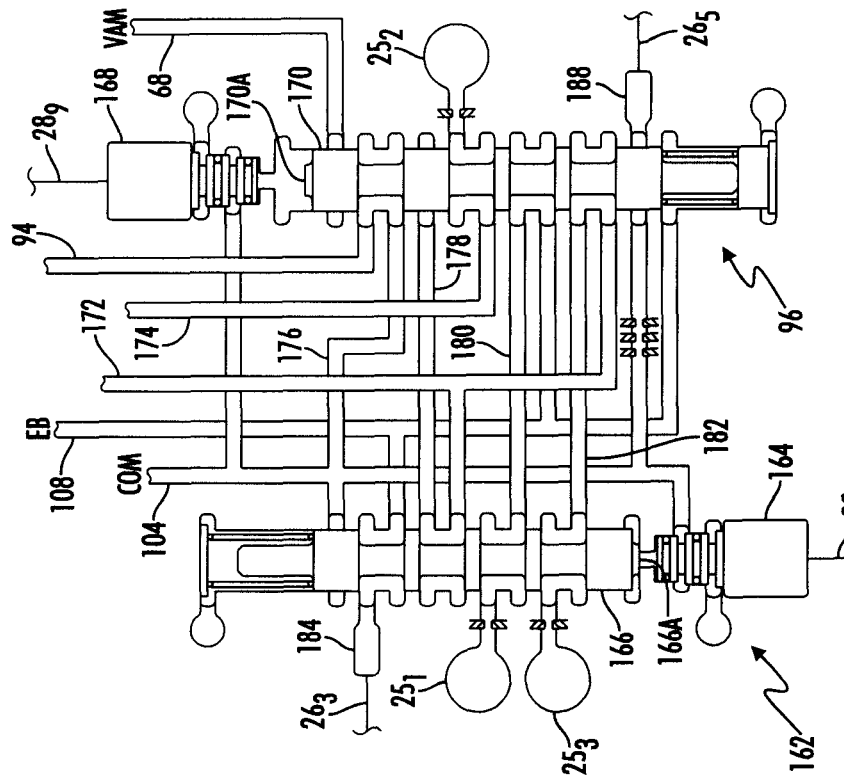
FIG. 4 is a magnified view of the clutch control valves illustrated in FIG. 3 showing one operating state thereof.

Under such conditions, i.e., when the fluid passages 172 and 174 both carry the clutch main pressure, CLM, FIG. 4 illustrates the case for a normal Mode 1-to-Mode 2 transition in which both of the clutch control valves 162 and 96 are activated, i.e., stroked, such that the control main pressure, COM, is applied by the actuator 164 to the control end 166A of the valve spool 166 and also by the actuator 168 to the control end 170A of the valve spool 170. In the resulting stroked position of the spool 166, the clutch control valve 162 fluidly couples the fluid passageway 172 to the C1 clutch fluid passageway $25_1$, thereby engaging the C1 clutch. Likewise, in the resulting stroked position of the spool 170, the clutch control valve 96 fluidly couples the fluid passageway 174 to the C2 clutch fluid passageway $25_2$, thereby engaging the C2 clutch. The stroked positions of the spools 166 and 170 further fluidly couple the exhaust backfill passageway 108, via the fluid passageway 180, to the C3 clutch fluid passageway $25_3$, thereby exhausting and disengaging the C3 clutch. The control main pressure, COM, is routed by the stroked positions of the spools 166 and 170 to both of the pressure switches 184 and 188. The transmission control circuit 30 processes the signals produced by the pressure switches 184 and 188 on the signal paths $26_3$ and $26_5$ respectively, and accordingly interprets the pressure switch states as "1 1" thereby identifying both of the clutch control valves 162 and 96 respectively as activated or stroked. This clutch valve position is typically used for launch, reverse and lower forward speeds. The control main pressure, COM, is also routed by the stroked position of the spool 170 to the variator trim valve 90 via the fluid passageways 176 and 94.

Figure 5:
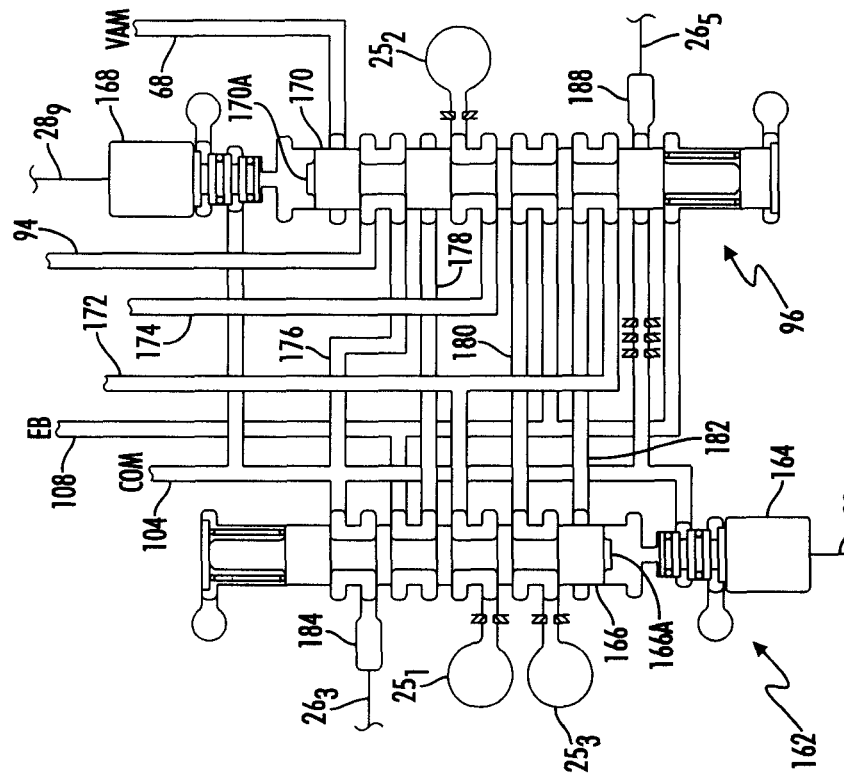
FIG. 5 is a magnified view of the clutch control valves illustrated in FIG. 3 showing another operating state thereof.

FIG. 5 illustrates the case for a normal Mode 2-to-Mode 3 transition in which the clutch control valve 162 is deactivated, i.e., de-stroked, and the clutch control valve 96 is activated, i.e., stroked, such that the actuator 164 exhausts the control end 166A of the valve spool 166, and control main pressure, COM, is applied by the actuator 168 to the control end 170A of the valve spool 170. In the resulting deactivated or de-stroked position of the spool 166, the clutch control valve 162 fluidly couples the fluid passageway 172, via the fluid passageway 182, to the C3 clutch fluid passageway $25_3$, thereby engaging the C3 clutch. In the resulting stroked position of the spool 170, the clutch control valve 96 fluidly couples the fluid passageway 174 to the C2 clutch fluid passageway $25_2$, thereby engaging the C2 clutch. The de-stroked position of the spool 166 and the stroked position of the spool 170 further fluidly couple the exhaust backfill passageway 108, via the fluid passageway 180, to the C1 clutch fluid passageway $25_1$, thereby exhausting and disengaging the C1 clutch. The exhaust backfill pressure, EB, is routed by the de-stroked position of the spool 166 to the pressure switch 184, and the control main pressure, COM, is routed by the stroked positions of the spool 170 to the pressure switch 188. The transmission control circuit 30 processes the signals produced by the pressure switches 184 and 188 on the signal paths $26_3$ and $26_5$ respectively, and accordingly interprets the pressure switch states as "0 1" thereby identifying the clutch control valve 162 as deactivated or de-stroked and the clutch control valve 96 as activated or stroked. This clutch valve position is typically used for higher forward speeds. The control main pressure, COM, is again routed by the stroked position of the spool 170 to the variator trim valve 90 via the fluid passageways 176 and 94.

FIG. 6 illustrates one of two clutch control valve states that generally would not occur during normal Mode-to-Mode transitions, and therefore represents one fault or failure state of the clutch control valves. More specifically, the case illustrated in FIG. 6 has the clutch control valve 162 activated, i.e., stroked, and the clutch control valve 96 deactivated, i.e., de-stroked, such that control main pressure, COM, is applied by the actuator 164 to the control end 166A of the valve spool 166, and the actuator 168 exhausts the control end 170A of the valve spool 170. In the resulting activated or stroked position of the spool 166, the clutch control valve 162 fluidly couples the fluid passageway 172 to the C1 clutch fluid passageway $25_1$, thereby engaging the C1 clutch as was illustrated in FIG. 4. In the resulting de-stroked position of the spool 170, the clutch control valve 96 fluidly couples the fluid passageway 174, via the fluid passageway 180, to the C3 clutch fluid passageway $25_3$, thereby also engaging the C3 clutch. The stroked position of the spool 166 and the de-stroked position of the spool 170 further fluidly couple the exhaust backfill passageway 108, via the fluid passageway 178, to the C2 clutch fluid passageway $25_2$, thereby exhausting and disengaging the C2 clutch. The control main pressure, COM, is routed by the stroked position of the spool 166 to the pressure switch 184, and the control main pressure, COM, routed to the pressure switch 188 is exhausted at the opposite end of the spool 170 as a result of the de-stroked position of the spool 170. The transmission control circuit 30 processes the signals produced by the pressure switches 184 and 188 on the signal paths $26_3$ and $26_5$ respectively, and accordingly interprets the pressure switch states as "1 0" thereby identifying the clutch control valve 162 as activated or stroked and the clutch control valve 96 as deactivated or de-stroked. This clutch valve position would generally not occur during normal operation of the transmission 14 as it simultaneously engages the clutches C1 and C3, and thus corresponds to a fault or failure condition. However, it should be noted that although the clutch valve position illustrated in FIG. 6 corresponds to a fault or failure condition, the clutch control valves 162 and 96 have been configured to provide limp-home capability by ensuring engagement of at least one of the clutches C1-C3. The variator main pressure, VAM, is routed by the de-stroked position of the spool 170 to the variator trim valve 90 via the fluid passageway 94.

FIG. 7 illustrates the other of two clutch control valve states that generally would not occur during normal Mode-to-Mode transitions, and therefore represents another fault or failure state of the clutch control valves. More specifically, the case illustrated in FIG. 7 has both the clutch control valve 162 and the clutch control valve 96 deactivated, i.e., de-stroked, such that the actuator 164 exhausts the control end 166A of the valve spool 166 and the actuator 168 exhausts the control end 170A of the valve spool 170. In the resulting deactivated or de-stroked positions of the spools 166 and 96, the clutch control valve 162 fluidly couples the fluid passageway 172 to fluid passageway 178, and the clutch control valve 96 fluidly couples the fluid passageway 178 to the C2 clutch fluid passageway $25_2$, thereby engaging the C2. The de-stroked position of the spool 170 of the clutch control valve 96 further fluidly couples the fluid passageway 174, via the fluid passageway 180, to the C1 clutch fluid passageway $25_1$, thereby also engaging the C1 clutch. The de-stroked positions of the spool 166 and 170 further fluidly couple the exhaust backfill passageway 108 to the C3 clutch fluid passageway $25_3$, thereby exhausting and disengaging the C3 clutch. The exhaust backfill, EB, is further routed by the de-stroked positions of the spools 166 and 170 to both of the pressure switches 184 and 188. The transmission control circuit 30 processes the signals produced by the pressure switches 184 and 188 on the signal paths $26_3$ and $26_5$ respectively, and accordingly interprets the pressure switch states as "0 0" thereby identifying the clutch control valve 162 as deactivated or de-stroked and the clutch control valve 96 as deactivated or de-stroked. This clutch valve position would generally not occur during normal operation of the transmission 14, and thus corresponds to a fault or failure condition. However, it should be noted that although the clutch valve position illustrated in FIG. 7 corresponds to a fault or failure condition, the clutch control valves 162 and 96 have been configured to provide limp-home capability by ensuring engagement of at least one of the clutches C1-C3. As was the case in FIG. 6, the variator main pressure, VAM, is routed in FIG. 7 by the de-stroked position of the spool 170 to the variator trim valve 90 via the fluid passageway 94.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. An apparatus for multiplexing gear engagement control in an automatic transmission operable in a plurality of operating modes, the apparatus comprising:
    a first and a second friction engagement device, each of the first and second friction engagement devices selectively engageable and disengageable to select a different gear ratio of the transmission,
    a trim system configured to selectively supply fluid at one of (i) an engagement pressure and (ii) a disengagement pressure to a first fluid passageway and a second fluid passageway in one of the plurality of operating modes, and
    a first control valve fluidly coupled directly to the first fluid passageway and the second fluid passageway and directly to the first friction engagement device and the second friction engagement device,
    wherein the first control valve is configured to contemporaneously route fluid at the engagement pressure to the first friction engagement device to engage the first friction engagement device and to the second friction engagement device to engage the second friction engagement device in a fault condition occurring during a transition between the plurality of operating modes of the transmission.

2. The apparatus of claim 1, wherein the first control valve is configured to (i) selectively route fluid at the engagement pressure to the first friction engagement device to the engage the first friction engagement device in one of the plurality of operating modes, and (ii) contemporaneously route fluid at the disengagement pressure to the second friction engagement device to disengage the second friction engagement device in the one of the plurality of operating modes.

3. The apparatus of claim 2, further comprising a second control valve fluidly coupled directly to each of the first and second fluid passageways, the second control valve configured to selectively route the engagement pressure in one of the first and second fluid passageways and the disengagement pressure in one of the first and second fluid passageways through the second control valve to the first control valve for further selective routing by the first control valve to each of the first and second friction engagement devices.

4. The apparatus of claim 3, further comprising a third friction engagement device selectively engageable and disengageable to select another different gear ratio of the transmission,
wherein the second control valve is fluidly coupled directly to the third friction engagement device, and wherein the second control valve is configured to selectively route one of the engagement and disengagement pressures in the second fluid passageway through the second control valve directly to the third friction engagement device.

5. The apparatus of claim 4, wherein the first control valve comprises a first spool having a stroked position and a de-stroked position and the second control valve comprises a second spool having a stroked position and a de-stroked position, and wherein the first and second control valves are together configured to supply the engagement pressure in at least one of the first and second fluid passageways to at least one of the first, second, and third friction engagement devices to thereby engage the at least one of the first, second, and third friction engagement devices in all possible position combinations of the first and second spools.

6. The apparatus of claim 5, wherein the first spool of the first control valve has a stroked position in the fault condition, and wherein the second spool of the second control valve has a de-stroked position in the fault condition.

7. The apparatus of claim 5, wherein the second control valve is fluidly coupled directly to a first main pressure fluid passageway and also directly to a third fluid passageway, the second control valve configured to selectively route pressure in the first main pressure fluid passageway to the third fluid passageway.

8. The apparatus of claim 6, wherein the second control valve routes fluid at the disengagement pressure to the third friction engagement device to disengage the third friction engagement device in the fault condition.

9. The apparatus of claim 7, wherein the second control valve is fluidly coupled directly to a second main pressure fluid passageway, the second control valve configured to selectively route pressure in the second main pressure fluid passageway to the third fluid passageway.

10. The apparatus of claim 9, wherein the automatic transmission is a toroidal traction drive transmission further comprising a variator and a variator control system for controlling operation of the variator, and wherein the second control valve is configured to selectively route pressure in the first and second main pressure fluid passageways to a component of the variator control system via the third fluid passageway.

11. An apparatus for multiplexing gear engagement control in an automatic transmission operable in a plurality of operating modes, the apparatus comprising:
a first control valve fluidly coupled to a first fluid passageway, a second fluid passageway, a first friction engagement device, and a second friction engagement device,
wherein the first control valve is configured to contemporaneously route fluid at (i) an engagement pressure to the first friction engagement device to engage the first friction engagement device and (ii) a disengagement pressure to the second friction engagement device to disengage the second friction engagement device in a fault condition occurring during a transition between the plurality of operating modes of the transmission.

12. The apparatus of claim 11, further comprising a second control valve fluidly coupled directly to each of the first and second fluid passageways, the second control valve configured to selectively route the engagement pressure in one of the first and second fluid passageways and the disengagement pressure in one of the first and second fluid passageways through the second control valve to the first control valve for further selective routing by the first control valve to each of the first and second friction engagement devices.

13. The apparatus of claim 12, wherein the second control valve is fluidly coupled directly to a third friction engagement device, and wherein the second control valve is configured to selectively route one of the engagement and disengagement pressures in the second fluid passageway through the second control valve directly to the third friction engagement device.

14. The apparatus of claim 13, wherein the first control valve comprises a first spool having a stroked position and a de-stroked position and the second control valve comprises a second spool having a stroked position and a de-stroked position, and wherein the first and second valves are together configured to supply the engagement pressure in at least one of the first and second fluid passageways to at least one of the first, second, and third friction engagement devices to thereby engage the at least one of the first, second, and third friction engagement devices in all possible position combinations of the first and second spools.

15. The apparatus of claim 14, wherein the first spool of the first control valve has a de-stroked position in the fault condition, and wherein the second spool of the second control valve has a de-stroked position in the fault condition.

16. The apparatus of claim 15, wherein the second control valve is configured to route fluid at the engagement pressure to the third friction engagement device to engage the third friction engagement device in the fault condition.

17. The apparatus of claim 16, wherein a trim system is configured to supply the engagement pressures to each of the first and second fluid passageways during the transition between the plurality of operating modes of the transmission to thereby engage two of the first, second, and third friction engagement devices during the transition.

18. The apparatus of claim 17, wherein the de-stroked and stroked positions of the first spool of the first control valve and the de-stroked and stroked positions of the second spool of the second control valve define four separate position combinations of the first and second control valves, and wherein two of the four separate position combinations of the first and second control valves are possible during transitions between the plurality of operating modes of the transmission.

19. The apparatus of claim 18, wherein at least one of the remaining two of the four separate position combinations of the first and second control valves represent the fault condition.

* * * * *